Figure 1:
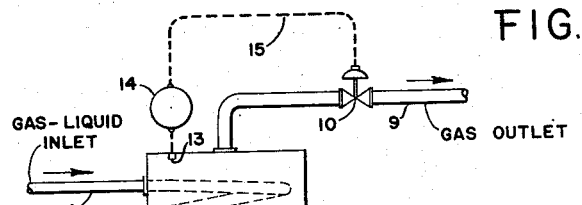

April 20, 1954   R. M. DEANESLY   2,675,883
RECOVERY OF LIQUIDS FROM GAS-OIL MIXTURES
Filed May 25, 1950

INVENTOR.
RICHARD M. DEANESLY
BY
ATTORNEYS.

Patented Apr. 20, 1954

2,675,883

UNITED STATES PATENT OFFICE 2,675,883

RECOVERY OF LIQUIDS FROM GAS-OIL MIXTURES

Richard M. Deanesly, Hinsdale, Ill., assignor to Universal Oil Products Company, Chicago, Ill., a corporation of Delaware Application May 25, 1950, Serial No. 164,271

6 Claims. (Cl. 183—2.7)

This invention relates to an improved method for effecting a greater recovery of liquids from gas-crude oil mixtures flowing at substantial superatmospheric pressures from producing wells.

Where crude oil flows at a substantially high superatmospheric pressure from a well accompanied by casinghead gas, and under conditions where gas to oil ratios of several hundred cubic feet per barrel prevail, it is known to be advantageous to minimize the production of gas by employing two or more stages of pressure reduction with interstage gas separation. In addition to reducing the overall gas to oil ratio, the multistage pressure let-down provides a larger part of the gas of low condensible content and at superatmospheric pressure which is more suitable for pipe line transmission. Also, along with an increase in the liquid recovery, the resulting liquid crude has a lower specific gravity permitting a greater monetary return.

It is a principal object of this invention to effect the cooling of a mixed gas-crude oil stream in a manner utilizing a heat exchange zone and a suitable work expansion type of engine, so that mechanical energy may be produced and dissipated as the pressure of at least a portion of the mixed stream is reduced; whereby to permit the separation of liquid from gas at a lower and more favorable temperature, and increase the liquid recovery from the oil well stream.

It is a further object of the present invention to provide a heat exchange and pressure reducing arrangement providing for the pressure reduction of the mixed stream from the producing well to be accomplished through turbo-expansion means and thereby produce mechanical energy along with polytropic expansion.

It is a still further object of the present invention to effect increased liquid recovery from a mixed stream of gas and liquid crude oil by passing the latter through a combined heat exchange and separation zone which connects with a turbine type expansion engine, with the latter suitable for effecting a substantially great temperature and pressure reduction in at least a portion of the charge stream and the production of mechanical energy thereby.

In a broad embodiment, the present invention provides for an increase in the liquid recovery from a mixed stream of gas and liquid crude oil issuing from a well at a substantially high superatmospheric pressure, in a manner which comprises, passing the stream through at least one combination of heat exchange and gas-liquid separation zone and work expansion stage, with the mixed stream passing in a confined path and in heat exchange relationship with a reduced temperature gas and reduced temperature liquid, as hereinafter set forth, continuously withdrawing a resulting partially cooled stream from the separation zone and continuously expanding it within a work expansion means effecting the generation of mechanical energy and a further reduced temperature effluent stream, continuously passing the resulting effluent stream in a heat exchange flow whereby to effect the cooling of the mixed gas-liquid stream as aforesaid, continuously withdrawing gas from the upper portion of the separation zone, and continuously discharging liquid from the lower end of the zone.

In a preferable arrangement, the work expansion means comprises a turbo-expansion engine, Pelton wheel, or the like, such that for example fan blades may be turned thereby to dissipate the energy. Alternatively this energy may be used to operate a pump, gas blower for transporting the gas, or for other purposes. Thus, the work done by the well head fluid against fan blades, a pump, or the like, that is the polytropic gas expansion through the turbine results in a high degree of cooling of the incoming well head fluid stream to permit the separation of liquid from gas at relatively low and favorable temperature conditions. The degree of cooling maintained within the gas-liquid separation zone may be varied in each individual case by the pressure reduction which is controlled by the relief valve on the effluent gas from the separator. The extent of cooling permissible in any given case being limited by the tendency to gas hydrate formation or formation of ice from accompanying water, as well as by economic factors of gas disposal.

Still other embodiments or arrangements of the improved method of operation will be described hereinafter. Also, one or more similar units or arrangements of heat exchange, turbo-expansion, and gas and liquid separation may be utilized in series, depending upon the well head pressure and other economic considerations. The increase in quantity of liquid recovered and the further lowering of specific gravity of the liquid stream, which may be obtained by use of additional stages, or alternatively the availability of a part of the gas at higher pressure must be balanced against the cost of their installation and maintenance.

Reference to the accompanying diagrammatic drawing and the following description thereof will serve to illustrate more clearly the present improved method of obtaining greater liquid recovery and a lower specific gravity oil from a mixed gas-oil stream issuing directly from a producing well. However, it is not intended to limit the invention to the particular structural and physical arrangements of equipment which are shown in these drawings.

Figure 1 of the drawing shows one simplified arrangement for effecting the heat exchange and increased liquid recovery.

Figure 2:
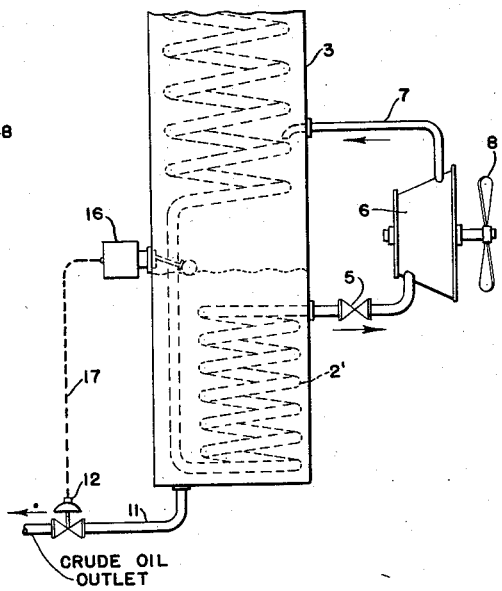

Figure 2 of the drawing illustrates a modified heat exchanger flow, whereby to achieve a slightly lower temperature of the material passing to the expander.

Referring now to Figure 1 of the drawing, a mixed stream of crude oil and casinghead gas is passed by way of line 1 to a suitable coil 2, tube bank, or the like, which is enclosed within a heat exchange and separation chamber 3. The mixed stream is thus passed in heat exchange relationship first with cooled uncondensible gas maintained in the upper portion of the chamber 3 and then with liquid crude oil maintained within the lower portion of the chamber and of considerably lower temperature than the mixed stream, so that a reduced temperature mixed stream is subsequently introduced by way of line 4 and control valve 5 into a suitable turbine or expansion engine 6. The stream undergoes polytropic expansion as it passes through the turbine or expansion engine 6 resulting in a greatly reduced temperature effluent stream. This resulting cooled stream is passed by way of line 7 to the interior of the separation chamber 3.

The turbo-expander 6 is indicated as having a fan blade 8 attached to a shaft from the rotor of the expansion engine, whereby the work or energy from the turbine may be dissipated by the fan blades beating the outside air. The expansion engine may of course dissipate its energy through an air-blower or other useful device, rather than through the propeller blade type of fan indicated in the drawing.

The considerably reduced temperature effluent stream passing through line 7 is discharged directly to the interior of the chamber 3 so that a gas-liquid separation may be effected therein. The uncondensed gas within the upper portion of the chamber 3 is continuously withdrawn by way of outlet line 9, having control valve 10 while liquid crude oil is collected within the lower portion of the chamber 3, whereby it may be continuously withdrawn by way of line 11 and control valve 12.

At the top of the chamber 3, a pressure sensitive element 13 and a pressure controller 14 connects through line 15 to the control valve 10, such that a substantially constant pressure is maintained within the chamber 3. The particular pressure maintained by controller 14 and regulating valve 10 depends upon the inlet pressure of the mixed stream through line 1 and the pressure let-down which may be permitted through the turbo-expander 6. A suitable liquid level controller 16 is also utilized in connection with the chamber 3, whereby a desired liquid level is maintained in the lower portion of the chamber. The controller 16 connects through line 17 to valve 12, such that the latter can in turn control the liquid withdrawal from the chamber by way of line 11.

To illustrate the operation, let it be assumed that a mixed crude oil and casinghead gas stream passes from a producing well by way of line 1 and into the coil 2 of chamber 3 at a relatively high pressure of the order of 150 pounds per square inch gauge and at a temperature of about 100° F. The mixed gas stream continues through coil 2 in indirect heat exchange relationship with the cooled casinghead gas stream in the upper portion of the chamber 3 and a cooled crude oil phase maintained in the lower portion of the chamber, so that it is subsequently discharged by way of line 4 at a temperature say of the order of 70° F. The partially cooled stream then passes through the turbo-expander 6 and is expanded and cooled to a temperature of the order of say 40° F. This resulting stream is discharged by way of line 7 to the interior of chamber 3, wherein the uncondensed casinghead gas phase is maintained under a regulated reduced pressure, say of the order of 50 p. s. i. g. by controller 14, and a resulting liquid phase is collected within the lower portion of the chamber 3. Both the gaseous and liquid phases are in indirect heat exchange relationship with the coil 2 and the confined incoming mixed gas-liquid stream, so that gas of the order of 80° F. is withdrawn from the chamber by way of line 9, and crude oil of the order of 60° F. in temperature, is withdrawn by way of line 11 at the bottom of the chamber. But it should be noted that the temperature at the actual zone of separation, which determines the composition of gas and liquid, is much lower than the withdrawal temperatures of the two streams.

Referring now to Figure 2 of the drawing, there is shown a modification of the heat exchange and recovery arrangement, with the internal coil or tubular arrangement accommodating the mixed gas-liquid stream, and indicated as 2', having the flow therethrough such that the outlet is near the upper surface of the liquid maintained within the lower portion of the separating chamber 3. In other words, a flow is provided which provides a substantially upward flow of the mixed gas-liquid stream through the liquid crude oil to achieve a slightly lower temperature of the material passing from the separating chamber by way of line 4 to the expander 6, and thus achieve a resulting lower temperature at the point of separation of the gas and liquid within the separation chamber itself.

In addition to the embodiments of my invention which have been shown and described, there are others more or less complex which are possible within the essential framework of this improved type of operation, which relates to the employment of an expansion engine operating on the well head fluid, or at least a part thereof, to effect the cooling which is in turn employed by means of suitably installed heat exchange means to precool all or a part of the well head fluid, whereby the separation of gas from the liquid crude oil takes place under more favorable conditions of temperature and pressure than would otherwise be possible.

Also, it may again be noted that while single units of heat exchange and pressure reduction are indicated in the accompanying drawing, that two or more of these units or arrangements placed in series may be economically desirable in order to provide more stages of pressure reduction and additional heat exchange zones, whereby to effect higher pressures for withdrawing a part of the resulting uncondensed gas.

I claim as my invention:

1. A method for increasing liquid recovery from a mixed stream of gas and liquid crude oil issuing from a well at a substantially high superatmospheric pressure, which comprises maintaining in a heat exchange and separating zone an upper gas phase and a lower liquid phase of components separated from said mixed stream as hereinafter set forth, passing said mixed stream at the well pressure through said zone in indirect heat exchange with said gas and liquid phases, thereafter expanding the mixed stream in turbo-expansion means to generate mechanical energy and reduce the temperature of said stream, introducing the thus expanded and cooled mixed stream into said zone above the surface of said liquid phase and therein separating the mixed stream into gas and oil components to form said gas and liquid phases maintained in said zone, and continuously withdrawing separated gas and liquid from the upper and lower portions, respectively, of said zone.

2. A separating apparatus comprising a vertical chamber, means for maintaining a gas phase in the upper portion of the chamber and a body of liquid in the lower portion thereof, a tubular heat exchange member within and extending through the upper and lower portions of the chamber and having fluid inlet and outlet means at opposite ends thereof, a turbo-expansion engine and a conduit connecting the inlet thereof to the outlet end of said tubular member, a second conduit connected to the outlet of said engine and terminating within said chamber at an intermediate point in the height thereof, a gas outlet at the upper end of the chamber and a liquid outlet at the lower end thereof.

3. The method of claim 1 further characterized in that said heat exchange and separation zone is maintained under a controlled superatmospheric pressure and a substantially constant liquid level is maintained within the lower portion thereof, and said mixed stream passes within a confined path downwardly through said separation zone whereby it is first maintained in heat exchange relationship with the gaseous phase and secondly with the liquid phase.

4. The method of claim 1 further characterized in that said turbo-expansion means comprises a hydraulic type turbine effecting a controlled pressure drop on said mixed stream passing therethrough and subsequently discharging into said combined heat exchange and separation zone.

5. The method of claim 4 still further characterized in that said hydraulic turbine means is positioned adjacent to said separation zone and the power therefrom effects the movement of outside air.

6. The apparatus of claim 2 further characterized in that automatic pressure control means connects with said gas outlet from said chamber, and automatic liquid level control means connects with said liquid outlet from said chamber whereby to maintain a controlled liquid level within the lower portion thereof.

References Cited in the file of this patent

UNITED STATES PATENTS

| Number | Name | Date |
|---|---|---|
| 1,907,924 | Wilson | May 9, 1933 |
| 1,974,145 | Atwell | Sept. 18, 1934 |
| 2,134,700 | Brewster | Nov. 1, 1938 |
| 2,134,702 | Brewster | Nov. 1, 1938 |
| 2,241,716 | Roberts, Jr., et al. | May 13, 1941 |
| 2,265,558 | Ward et al. | Dec. 9, 1941 |
| 2,493,981 | Latchum, Jr. | Jan. 10, 1950 |